_United States Patent Office_

2,752,366
Patented June 26, 1956

2,752,366

CARBONYLOXYSTEROIDS

John A. Hogg, Philip F. Beal, and Frank H. Lincoln, Jr., Kalamazoo, Mich., assignors to The Upjohn Company, Kalamazoo, Mich., a corporation of Michigan No Drawing. Application November 6, 1952, Serial No. 319,173

41 Claims. (Cl. 260—397.1)

This invention relates to certain $\Delta^{17(20)}$-steroid-21-acids and esters thereof, a process for the production thereof, and to the use of these compounds in further syntheses involving other novel and useful steroid compounds, all as more fully disclosed hereinafter. The present application is a continuation-in-part of our co-pending application Serial Number 307,385, filed August 30, 1952.

It is an object of the present invention to provide novel $\Delta^{17(20)}$-steroid-21-acids and esters thereof. Another object is the provision of a process for the production of new and known $\Delta^{17(20)}$-steroid-21-acids and esters thereof. Still another object of the present invention is the provision of a process for the production of novel 3-keto - $\Delta^{4,17(20)}$ - unsaturated - 21 - carbonyloxysteroids, the production of which has not heretofore been possible by any known method from any known starting material. Other objects will be apparent to those skilled in the art to which this invention pertains.

Certain of the novel compounds of the present invention have utility as precursors to known steroids, especially to the physiologically active cortical hormones 11β,17α,21-trihydroxy-4-pregnene-3,20-dione (Kendall's Compound F) and 17α,21-dihydroxy-4-pregnene-3,11,20-trione (Kendall's Compound E) and esters of the above-named compounds which may be prepared, in accordance with the present invention, by a series of representative reactions and compounds which may be graphically illustrated as follows:

M=H, alkali metal
X=halogen
R=H, —COO-hydrocarbon
R', R''=H, hydrocarbon
R'''=H, acyl radical
n=1 or 2
Ac=acyl radical Treatment of an 11-keto-21,21-dihalo-21-alkoxyoxalylprogesterone (III', R=COO-alkyl) or an 11-keto-21,21-dihalo-21-formylprogesterone (III', R=H) with a base in the presence of alkoxy ions, e. g., sodium methoxide in methanol, is productive of a 3,11-diketo-4,17(20) - pregnadiene - 21 - oic acid alkyl ester (IV', R'=alkyl) of the present invention. Treatment of one of these compounds, after protecting the 3-ketone with a ketal group, e. g., an ethylene group ketal group (V', R'=alkyl, R''=H, n=1), an alkyl enol ether, or the like, with a reducing agent capable of reducing a carboxylic acid ester and a ketonic oxygen to hydroxy groups, e. g., lithium aluminum hydride, or other alkali-metal aluminum hydride, and then hydrolyzing the resulting reaction product (VI) is productive of 11β,21-hydroxy-4,17(20)-pregnadiene-3-one (VII). This compound or a 21-acyl ester thereof is readily convertible to 11β,17α,21-trihydroxy-4-pregnene-3,20-dione (IX, R'''=H) (Kendall's Compound F) by reaction with osmium tetroxide to produce the 11β,17α,20,21-tetrahydroxy-4-pregnene-3-one osmate ester and subsequent oxidation, as with perchloric acid, salts thereof, or other equivalent oxidizing agents such as hydrogen peroxide, dialkyl peroxides, organic peracids such as peracetic or perbenzoic acid, or the like, in a solvent such as an ether or an alcohol, e. g., tertiary butyl alcohol or diethyl ether, according to procedure already known in the art [Prins and Reichstein, Helv. Chim. Acta, 25, 300 (1942); Ruzicka and Mueller, Helv. Chim. Acta, 22, 755 (1939)].

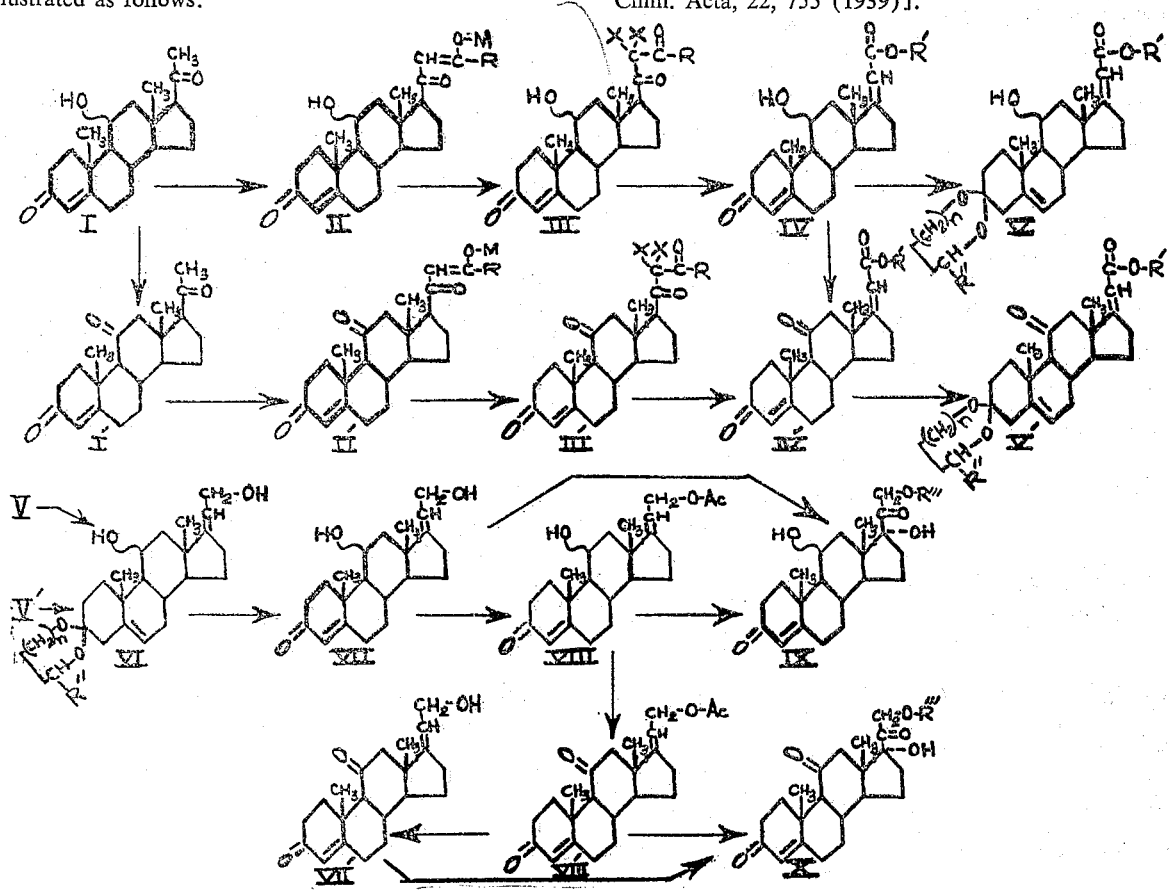

Similarly, starting with an 11-hydroxy-21,21-dihalo-21-alkoxyoxalylprogesterone (III, R=COO-alkyl) or an 11 - hydroxy - 21,21 - dihalo - 21 - formylprogesterone (III, R=H), and proceeding through the same reactions described above, but oxidizing the 11-hydroxy group to an 11-keto group, as with chromic acid, prior to the osmium tetroxide hydroxylation and the subsequent oxidation, is productive of 17α,21 - dihydroxy - 4 - pregnene-3,11,20-trione (X, R'''=H) (Kendall's Compound E).

Similarly, starting with a 21,21-dihalo-21-alkoxyoxalylprogesterone (11-desoxy-III, R=COO-alkyl) or a 21,21 - dihalo-21 - formylprogesterone (11 - desoxy - III, R=H) and proceeding through the same reactions described above for the production of Kendall's Compound F, there is produced 17α,21-dihydroxyprogesterone which can be converted to Kendall's Compound F according to known methods.

The $\Delta^{17(20)}$-steroid-21-oic acids and esters which can be produced according to the method of the present invention may be represented by the following formula:

$$St=CH—COOR \qquad (XI)$$

wherein R is hydrogen or a hydrocarbon radical, especially aliphatic radicals containing from one to eight carbon atoms, inclusive, and wherein St represents a cyclopentanopolyhydrophenanthrene nucleus attached by the double bond to the above-identified side chain at carbon atom 17. Compounds included therein are steroids wherein an α-hydroxy or a β-hydroxy group, or a group hydrolyzable or convertible thereto, i. e., acyloxy, alkoxy, or the like, or ketonic oxygen, is attached to carbon atom 3, carbon atom 11, or both, and wherein there is no double bond, one double bond, or a plurality of double bonds in the steroid nucleus.

The preferred novel $\Delta^{17(20)}$-steroid-21-oic acids and esters thereof of the present invention, i. e., steroids readily convertible to Kendall's Compound E (17α, 21-dihydroxy-4-pregnene-3,11,20-trione) (X, R'''=H) or Kendall's Compound F (11β,17α,21-trihydroxy-4-pregnene-3,20-dione (IX, R'''=H), may be represented by the following formula:

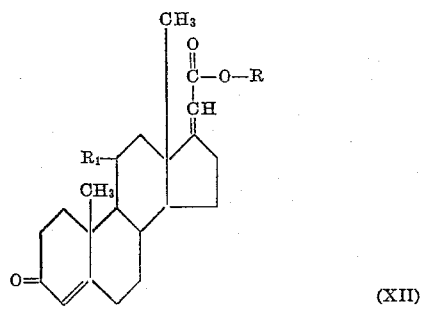

(XII)

wherein R has the value given for Formula XI and wherein $R_1$ is α-hydroxy, β-hydroxy, or ketonic oxygen (=O).

According to the method of the present invention, a steroid having the following formula:

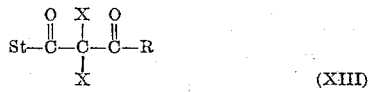

(XIII)

wherein X is halogen having an atomic weight from 35 to 127, inclusive, wherein R is hydrogen or a radical having the formula

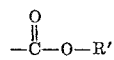

R' being a hydrocarbon radical, and wherein St represents a cyclopentanopolyhydrophenanthrene radical attached to the above-described side chain at carbon atom 17 and having a 17-hydrogen, is contacted with a base in the presence of hydroxy or alkoxy ions to produce a compound represented by Formula XI. The preferred $\Delta^{17(20)}$-steroid-21-acids and esters thereof are prepared from compounds represented by Formula XIII wherein St represents an 11-hydroxy or 11-keto-4-androstene-3-one radical attached to the above-identified side chain at carbon atom 17 and having a 17-hydrogen. Preferably, the reaction is carried out in the presence of a liberal source of hydroxy and/or alkoxy ions, e. g., potassium hydroxide in methanol, sodium ethoxide in ethanol, sodium hydroxide in water, or the like. The formation of a carbonyloxy steroid of Formula XI from a compound of Formula XIII requires the presence of hydroxy or alkoxy ions in the reaction mixture to produce the hydroxy or alkoxy portion of the carbonyloxy radical. When the ions of the reaction are all alkoxy ions, the reaction product is an alkyl ester of the 21-acid produced, whereas when the only ions are hydroxy ions, the reaction product is the free 21-acid. The use of a hydroxy base, e. g., sodium hydroxide, in an alkoxy solvent, e. g., methanol, will produce a mixture of the free acid (as the sodium salt, for example) and an alkyl ester thereof.

The starting steroids represented by Formula XIII are prepared by contacting a steroid having, in one of its forms, the following formula:

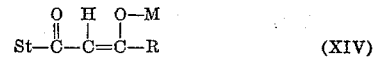

(XIV)

wherein M is hydrogen or an alkali metal, especially sodium or potassium, and wherein St and R have the values given for Formula XIII, with about two molar equivalents of a halogen having an atomic weight from 35 to 127, i. e., chlorine, bromine, or iodine, to produce a compound represented by Formula XIV. The compounds of Formula XIV in turn are prepared by contacting the selected 20-ketosteroid with an ester of oxalic acid or an ester of formic acid in the presence of an alkali-metal base at a temperature between about zero degrees centigrade and the boiling point of the reaction mixture, usually in a solvent such as, for example, toluene, benzene, methanol, ethanol, mixtures of these, or the like, to produce a compound represented by Formula XIV wherein M is an alkali metal. Acidification of an aqueous solution of one of the above-described compounds is productive of a compound represented by Formula XIV wherein M is hydrogen.

When a 21-alkoxyoxalyl steroid is employed as starting material, the alkoxy group thereof preferably contains from one to eight carbon atoms, inclusive, with methoxy and ethoxy being preferred. Starting steroids of particular interest are 11α-hydroxy- and 11-keto-21,21-dihalo-21-alkoxyoxalylprogesterones wherein the alkoxy group is methoxy or ethoxy, and 11α-hydroxy- and 11-keto-21,21-dihalo-21-formylprogesterone. The preparation of these and other starting steroids is more fully illustrated by the examples hereinafter.

The halogenation step of the present invention is usually conducted in an organic solvent which is non-reactive under the conditions of the reaction. Methanol and ethanol have been found to be particularly useful solvents and are usually preferred, although chloroform or methylene chloride in the presence of pyridine, acetic acid in the presence of potassium acetate, and others may also be used. Since the presence of a base, e. g., an alkali-metal salt of an aliphatic acid, or carbonic acid, e. g., sodium carbonate, sodium bicarbonate, or the like, appears to enhance the yield of desired product, the halogenation is usually conducted in the presence of a base, especially potassium or sodium acetate.

The halogenating agents are halogens having an atomic weight from 35 to 127, i. e., chlorine, bromine, or iodine. In carrying out the halogenation, about two moles of halogen to one mole of starting steroid are employed. Use of substantially higher or lower ratios of halogen to starting steroid is not advantageous and is usually avoided, since less than optimum yields of product are usually obtained thereby. The reaction is most conveniently conducted at about room temperature, e. g., twenty to thirty degrees centigrade, although other temperatures, e. g., between about zero degrees centigrade and about sixty degrees centigrade may also be used.

The 21,21-dihalosteroid product may conveniently be isolated from the reaction mixture either by adding a large volume of water thereto if the reaction solvent is water-miscible, usually at about room temperature or lower, thus precipitating the desired 21,21-dihalosteroid, or the solvent may be removed from the reaction mixture leaving a residue which, after washing with water, consists essentially of the desired product.

The thus-produced 21,21-dihalosteroid, represented by Formula XIII wherein the cyclopentanopolyhydrophenanthrene radical contains a 17-hydrogen, may be reacted with a base such as, for example, an alkali-metal hydroxide, an alkali-metal alcoholate, or the like, to produce a compound of the present invention represented by Formula XI. Reacting 11-keto-21-formyl-21,21-dibromoprogesterone (III', R=H, X=Br), for example, with an alkali-metal alkoxide, e. g., sodium methoxide, or similar base, in an alkanol, e. g., methanol, is productive of a 3,11-diketo-4,17(20)-pregnadiene-21-oicacid alkyl ester (IV', R=alkyl). Since the particular alkyl ester of the above-named acid, produced in the above described reaction, is determined by the alkyl group of the alkali-metal alkoxide employed in the reaction, when an alkanol is a reaction solvent, the alkyl group of the alkanol solvent is preferably the same as the alkyl group of the alkali-metal alkoxide employed in the reaction, thus eliminating the possibility of mixed ester formation due to exchange reactions. Other starting compounds from which these 21-oicacid alkyl esters are produced in this manner include 11-keto-21-formyl-21,21-dihaloprogesterones and 11-keto-21-alkoxyoxalyl-21,21-dihaloprogesterones, wherein the halogen is chlorine, bromine, or iodine, and wherein the alkoxy group preferably contains from one to eight carbon atoms, inclusive, and especially wherein the alkoxy group is methoxy or ethoxy. Similarly, 3-keto-11α- or 11β-hydroxy-4,17(20)-pregnadiene-21-oicacid alkyl esters (IV, R=alkyl) are prepared by reacting the selected 11-hydroxy-21-formyl or 21-alkoxyoxalyl-21,21-dihalosteroid with an alkali-metal alkoxide or similar base in an alkanol, especially methanol or ethanol, as described above.

When a 21-acid is the desired reaction product rather than an alkyl ester thereof, i. e., when R is hydrogen in Formula XI, the reaction is performed in exactly the same manner except that the alkali-metal alkoxide of the reaction is replaced by an alkali-metal hydroxide, and the reaction is usually carried out in a solvent containing water. After the reaction has gone to completion, acidification of the reaction mixture is productive of the free acid which can thereafter be separated and purified in the usual manner.

A particularly satisfactory procedure for obtaining a compound of Formula XI involves reacting the selected 21-acylsteroid (XIV) with about two molar equivalents of chlorine, bromine, or iodine, preferably bromine, in an alkanol, e. g., methanol or ethanol, advantageously in the presence of potassium acetate or the like, to produce the desired 21,21-dihalosteroid (XIII), and then converting this compound directly, without isolation, to the desired 21-acid or ester (XI). According to this mode of operation, a base, e. g., an alkali-metal alkoxide, is added to the reaction mixture after addition of halogen is complete, to cause reaction thereof with the 21,21-dihalo compound (XIII), to produce the desired 21-acid or ester (XI), e. g., a 3-keto-11-oxygenated-4,17(20)-pregnadiene-21-oic acid or an alkyl ester thereof (XII).

The conversion of a 21,21-dihalosteroid represented by Formula XIII to a $\Delta^{17(20)}$-steroid-21-oic acid or ester thereof is conducted at a temperature between about zero degrees centigrade and the boiling point of the reaction mixture, with room temperature, i. e., between about twenty and about thirty degrees centigrade, being preferred for convenience as the reaction temperature. At the lower temperature, the reaction product has predominantly the 17(20)-cis stereoconfiguration whereas at higher temperatures, higher yields of 17(20)-trans isomer are obtained.

The reaction solvent does not appear to be critical to the success of the reaction and alkanols, e. g., methanol, ethanol, tertiary butyl alcohol, cyclohexanol, and the like, an alkanol plus water, an alkanol plus benzene, toluene, diethyl ether, or other non-reactive polar and non-polar solvents, e. g., dioxane, diethyl ether, benzene, toluene, tetrahydrofuran, alone or in combination, are satisfactory reaction solvents. Methanol has been repeatedly used with consistently satisfactory results and tertiary butyl alcohol and ethanol are also satisfactory solvents.

Bases which can be used for the conversion of a compound represented by Formula XIII to a compound represented by Formula XI include alkali-metal alkoxides, e. g., sodium methoxide, sodium ethoxide, sodium isopropoxide, potassium tertiary butoxide, sodium hydroxide, potassium hydroxide, alkali-metal carbonates, e. g., sodium carbonate, potassium carbonate, sodium hydroxide, potassium propionate, basic ion-exchange resins, quaternary ammonium hydroxides, e. g., Triton B trimethyl benzyl ammonium hydroxide, and others. When ether, benzene, or other water-immiscible reaction solvent is employed, the base is usually dry sodium methoxide or the like, whereas when dioxane, tetrahydrofuran, alkanol, or other water-miscible solvent is employed, the base may be an alkali-metal hydroxide, carbonate, or others. Optimum yields of desired product are usually obtained when greater than about two molar equivalents of base are employed per mole of steroid.

In every case, there is necessary for the conversion of a compound of Formula XIII to a compound of Formula XI a base to carry out the conversion and a source of hydroxy or alkoxy ions. The base itself may sometimes be that source, e. g., sodium methoxide, sodium hydroxide, or the like, but an additional source of hydroxy or alkoxy ions is usually employed.

At about room temperature, the reaction appears to be essentially complete in from about one-half to about eight hours, with the exact time necessary for complete reaction depending upon the particular starting steroid employed, the base, and to a certain extent, the solvent. When reaction temperatures substantially above room temperature are employed, the desired reaction is sometimes accompanied by some decomposition of the steroid in the reaction mixture when a particularly reactive base is employed. Usually high temperatures are not desirable except where time limitations make the reaction at room temperature impractical. Similarly, reactions which are unduly rapid at room temperature may sometimes advantageously be controlled by lowering the reaction temperature to below room temperature, e. g., about zero to twenty degrees centigrade. In general, the reaction time is somewhat inversely proportionate to the reaction temperature.

When a $\Delta^{17(20)}$-steroid-21-oic acid alkyl ester (XI, R=alkyl) is the reaction product, the isolation of said product is conveniently achieved by washing the reaction mixture with water and dilute acid, if the reaction solvent is water-immiscible, and then distilling the solvent layer to leave a residue of desired product. If the reaction solvent is water-miscible, the reaction product can be isolated by adding a large volume of cold water to the mixture and filtering the thus-precipitated steroid. In either case, the solvent can alternatively be removed by distilling at reduced pressure and the product isolated by washing the distillation residue with water and then drying the insoluble material.

When a $\Delta^{17(20)}$-steroid-21-oicacid (XI, R=H) is the reaction product, isolation of said product is conveniently achieved, when the reaction solvent is water-immiscible, by washing the reaction mixture with dilute base, thereby extracting the steroid acid as the salt, and thereafter acidifying the aqueous extract to produce a precipitate of the steroid acid. When the reaction solvent is water-miscible, isolation of the steroid acid can be achieved in the same manner as an ester thereof, making certain the reaction mixture is neutral or slightly acidic.

The following preparations and examples are illustrative of the products and process of the present invention and the utility of both the products and process of the present invention but are not to be construed as limiting.

The reactions described below are productive of compounds which are especially useful as precursors to 11β, 17α,21-trihydroxy-4-pregnene-3,20-dione (Kendall's Compound F).

PREPARATION 1.—SODIUM ENOLATE OF 11-KETO-21-ETHOXYOXALYLPROGESTERONE

To a mixture of 3.4 milliliters of a 3.4 N methanolic sodium methoxide solution, 0.45 milliliter of absolute ethanol, and twenty milliliters of dry benzene, said mixture previously having been distilled until eight milliliters of distillate had been collected and then cooled, was added 2.3 milliliters of ethyl oxalate and a solution of 3.28 grams of 11-ketoprogesterone in 38 milliliters of dry benzene. The solution became turbid and a yellow precipitate formed. The reaction mixture was stirred for ninety minutes, 55 milliliters of ether was then added thereto, and stirring was continued for sixty minutes, whereafter a 130-milliliter portion of ether was added thereto. The thus-formed yellow precipitate of the sodium enolate of 11-keto-21-ethoxyoxalylprogesterone was filtered, washed with several fifty-milliliter portions of ether, and after drying found to weigh 3.65 grams. The ether wash contained 0.54 gram of unreacted 11-ketoprogesterone. The yield of the sodium enolate of 11-keto-21-ethoxyoxalylprogesterone was 81 percent of the theoretical or practically quantitative calculated on the reacted 11-ketoprogesterone. The presence of a sodium enolate was verified by the extreme solubility of the product in water and by a positive ferric chloride test for enols as exhibited by the formation of a bright red color when the product was dissolved in alcoholic and aqueous ferric chloride solutions.

Acidification of an aqueous solution of the thus-produced sodium enolate of 11-keto-21-ethoxyoxalylprogesterone is productive of 11-keto-21-ethoxyoxalylprogesterone which may be removed therefrom by filtration.

PREPARATION 2.—POTASSIUM ENOLATE OF 11-KETO-21-ETHOXYOXALYLPROGESTERONE

Using essentially the procedure described in Preparation 1, 11-ketoprogesterone is converted to the potassium enolate of 11-keto-21-ethoxyoxalylprogesterone by reaction with ethyl oxalate in benzene and potassium in tertiary butyl alcohol.

In a manner similar to Preparations 1 and 2, the following compounds are prepared by the reaction of 11-ketoprogesterone with the appropriate alkyl oxalate and sodium or potassium alkoxide in benzene, toluene, ethanol, or other suitable solvent: sodium enolate of 11-keto-21-methoxyoxalylprogesterone, sodium enolate of 11-keto-21-propoxyoxalylprogesterone, sodium enolate of 11-keto-21-butoxyoxalylprogesterone, sodium enolate of 11-keto-21-isobutoxyoxalylprogesterone, sodium enolate of 11-keto-21-amyloxyoxalylprogesterone, sodium enolate of 11-keto-21-hexyloxyoxalylprogesterone, sodium enolate of 11-keto-21-heptyloxyoxalylprogesterone, sodium enolate of 11-keto-21-octyloxyoxalylprogesterone, the potassium analogues of these and like compounds, and others.

Acidification of an aqueous solution of any of the above-described alkali-metal enolates is productive of a precipitate of the free 21-alkoxyoxalyl compound which can be removed therefrom by filtration.

PREPARATION 3.—SODIUM ENOLATE OF 11-KETO-21-FORMYLPROGESTERONE

To a mixture of 3.4 milliliters of a 3.4 N methanolic sodium methoxide solution, 0.45 milliliter of absolute ethanol, and twenty milliliters of dry benzene, said mixture previously having been distilled until eight milliliters of distillate had been collected and then cooled, was added two milliliters of ethyl formate and a solution of 3.28 grams (0.01 mole) of 11-ketoprogesterone in 38 milliliters of dry benzene. The solution became turbid and a yellow precipitate formed. The reaction mixture was stirred at room temperature for one hour, sixty milliliters of ether was then added thereto, and stirring was continued for ninety minutes, whereafter a sixty-milliliter portion of ether was added thereto. The thus-formed yellow precipitate of the sodium enolate of 11-keto-21-formylprogesterone was filtered, washed with several fifty-milliliter portions of ether, and after drying found to weigh 2.35 grams. The ether wash contained 1.21 grams of unreacted 11-ketoprogesterone. The yield of the sodium enolate of 11-keto-21-formylprogesterone was 62 percent of the theoretical or practically quantitative calculated on the reacted 11-ketoprogesterone. The presence of a sodium enolate was verified by the extreme solubility of the product in water and by a positive ferric chloride test for enols as exhibited by the formation of a red color when the product was dissolved in alcoholic and aqueous ferric chloride solutions. The structure was further verified by conversion of the enolate to the free 11-keto-21-formylprogesterone melting at 85 to 90 degrees centigrade and having an infrared absorption spectrum analysis consistent with the structure.

PREPARATION 4.—POTASSIUM ENOLATE OF 11-KETO-21-FORMYLPROGESTERONE

Using essentially the procedure described in Preparation 3, 11-ketoprogesterone is converted to the potassium enolate of 11-keto-21-formylprogesterone by reaction with ethyl formate and potassium in tertiary butyl alcohol.

In the same manner as described in Preparations 3 and 4, the following compounds are preparing by reacting the selected 20-ketosteroid with ethyl formate, or other alkylformate, in the presence of sodium base, preferably a sodium alkoxide: the sodium enolate of 21-formyl-4,16-pregnadiene-3,20-dione, the sodium enolate of 3α-hydroxy - 21 - formylpregnane - 11,20 - dione (free enol, M. P.=95 to 102 degrees centigrade), the sodium enolate of 3α,17α-dihydroxy-21-formylpregnane-11,20-dione, the sodium enolate of 21-formyl-4-pregnene-3,20-dione, the sodium enolate of 16(17)-oxido-21-formyl-4-pregnene-3,20-dione, the sodium enolate of 3α,11α-dihydroxy-21-formylpregnane-20-one, the sodium enolate of 3α,17α-dihydroxy-21-formylpregnane-11,20-dione, and the like. The potassium enolates of these and other compounds are prepared by substituting potassium tertiary butoxide for the sodium base used in the above-described reaction. The free enols of the above-named compounds are prepared by acidifying an aqueous or alkanolic solution of any of the above-named compounds with hydrochloric acid or other acid.

The corresponding 21-alkoxyoxalyl derivatives of the above-named compounds are prepared by replacing the alkyl formate used in the above-described reaction with the appropriate alkyl oxalate.

Acidification of an aqueous solution of the potassium or sodium enolate of 11-keto-21-formylprogesterone is productive of a precipitate of 11-keto-21-formylprogesterone.

*Example 1.—11-keto-21,21-dibromo-21-ethoxyoxalylprogesterone*

To a stirred solution of 4.50 grams (0.01 mole) of the sodium enolate of 11-keto-21-ethoxyoxalylprogesterone and two grams of potassium acetate in seventy milliliters of glacial acetic acid was added 3.09 grams (1.00 ml.; 0.0193 mole) of bromine dropwise at room temperature. When the addition was complete, the reaction mixture was mixed with a large volume of water. The aqueous layer was then decanted from the precipitated viscous yellow product which was thereafter dissolved in alcohol and reprecipitated as a white solid by the dropwise addition of water. The yield of thus-produced 11-keto-21,21-dibromo-21-ethoxyoxalylprogesterone, after filtering and drying, was 4.0 grams, a yield of seventy percent of the theoretical.

Other 11-keto-21,21-dihalo-21-alkoxyoxalylprogesterones are prepared wherein the dihalo group is dibromo, dichloro, or diiodo and the alkoxy group is methoxy, ethoxy, propoxy, butoxy, amyloxy, hexyloxy, heptyloxy, octyloxy, or the like, by dihalogenating the selected 11-keto-21-alkoxyoxalylprogesterone with chlorine, bromine, or iodine, according to the method described in Example 1.

*Example 2.—11-keto-21,21-dichloro-21-formylprogesterone*

In exactly the same manner as described in Example 1, contacting 11-keto-21-formylprogesterone with two molar equivalents of chlorine is productive of 11-keto-21,21-dichloro-21-formylprogesterone.

Similarly, 11-keto-21,21-dibromo-21-formylprogesterone and 11-keto-21,21-diiodo-21-formylprogesterone are prepared by using about two molar equivalent amounts of bromine and iodine, respectively, instead of the chlorine used in the above-described reaction.

In the same manner described in Examples 1 through 3, the following compounds are prepared by reacting a selected 20-keto-21-formylsteroid or an alkali-metal enolate thereof with about two molar equivalents of the appropriate selected halogen, i. e., chlorine, bromine, or iodine: 21,21-dibromo-21-formyl-4,16-pregnadiene-3,20-dione, 3α-hydroxy-21,21-dibromo-21-formylpregnane-11,20-dione (M. P. 193 to 200 degrees centigrade), 3α,17α-dihydroxy-21,21-diiodo-21-formylpregnane-11,20-dione, 16(17)-oxido-21,21-dibromo-21-formyl-4-pregnene-3,20-dione, 21,21-dibromo-21-formyl-4-pregnene-3,20-dione, 3α,11α-dihydroxy-21,21-dichloro-21-formylpregnane-20-one, 3α,17α-dihydroxy-21,21-diiodo-21-formylpregnane-11,20-dione, 21,21-dihalogen analogues of these, and the like.

The corresponding 21-alkoxyoxalyl compounds wherein the alkoxy group is methoxy, ethoxy, propoxy, butoxy, amyloxy, hexyloxy, heptyloxy, octyloxy, or the like, are prepared by replacing the starting 20-keto-21-formylsteroid or alkali-metal enolate by the appropriate 20-keto-21-alkoxyoxalylsteroid or alkali-metal enolate thereof.

*Example 3.—3,11-diketo-4,17(20)-pregnadiene-21-oicacid methyl ester*

To a solution of 5.90 grams (0.01 mole) of 11-keto-21,21-dibromo-21-ethoxyoxalylprogesterone, obtained according to the method given in Example 1, in 150 milliliters of methanol, was added 3.24 grams (0.06 mole) of commercial grade sodium methoxide. The resulting admixture was maintained for three hours at about 25 degrees centigrade, whereafter the whole was diluted with water and then extracted with two portions of methylene chloride. The methylene chloride extracts were dried with anhydrous sodium sulfate and the solvent was thereafter distilled at atmospheric pressure, leaving a quantitative yield of 3.60 grams of 3,11-diketo-4,17(20)-pregnadiene-21-oicacid methyl ester as an oil. This oil was dissolved in fifty milliliters of benzene and chromatographed over a column of 170 grams of Florisil synthetic magnesium silicate. The column was developed with 400-milliliter portions of solvent of the following composition and order: three portions of methylene chloride, five portions of methylene chloride plus five percent acetone, and one portion of acetone. The methylene chloride plus five percent acetone eluates were combined and the solvent was removed therefrom leaving 1.5 grams of crystalline 3,11-diketo-4,17(20)-pregnadiene-21-oicacid methyl ester which, after crystallization from acetone and Skellysolve B hexane hydrocarbons, melted at 213 to 214 degrees centigrade.

*Analysis.*—Calculated for $C_{22}H_{28}O_4$: C, 74.17; H, 7.92. Found: C, 74.37; H, 8.21.

*Example 4.—3,11-diketo-4,17(20)-pregnadiene-21-oicacid ethyl ester*

In the same manner as described in Example 3, 3,11-diketo-4,17(20)-pregnadiene-21-oicacid ethyl ester is prepared by replacing the sodium methoxide in methanol used in the above-described example with sodium ethoxide in ethanol.

Similarly, other 3,11-diketo-4,17(20)-pregnadiene-21-oicacid esters are prepared wherein the ester is lower-alkyl, e. g., propyl, butyl, amyl, hexyl, heptyl, octyl, or the like, by replacing the sodium methoxide in methanol used in the above-described reaction with the selected alkali-metal alkoxide in an alkanol.

*Example 5.—3,11-diketo-4,17(20)-pregnadiene-21-oicacid*

In exactly the same manner as given in Example 3, 3,11-diketo-4,17(20)-pregnadiene-21-oicacid was prepared from the sodium enolate of 11-keto-21-ethoxyoxalylprogesterone by substituting 3.4 grams (0.06 mole) of potassium hydroxide in ten milliliters of water for the sodium methoxide used in the above-described reaction, thus producing the potassium salt of the desired acid. The 3,11-diketo-4,17(20)-pregnadiene-21-oicacid was isolated by washing the reaction mixture with methylene chloride, acidifying with dilute hydrochloric acid and extracting the thus-produced oily precipitate with benzene. The benzene extract was washed with water, dried, and thereafter distilled at reduced pressure to remove the benzene. The residual 3,11-diketo-4,17(20)-pregnadiene-21-oicacid, after several crystallizations, melted at 255 to 260 degrees centigrade.

*Example 6.—3,11-diketo-4,17(20)pregnadiene-21-oicacid*

In the same manner as described in Example 5, 3,11-diketo-4,17(20)-pregnadiene-21-oicacid is prepared by reacting any of the dihalo compounds described in Examples 1 and 2 with a base in the presence of water, preferably an alkali-metal hydroxide, e. g., sodium or potassium hydroxide, and thereafter acidifying the reaction mixture to produce the free acid.

*Example 7.—3,11-diketo-4,17(20)-pregnadiene-21-oicacid methyl ester (from the sodium enolate of 11-keto-21-ethoxyoxalylprogesterone)*

To a stirred solution of 4.50 grams (0.01 mole) of the sodium enolate of 11-keto-21-ethoxyoxalylprogesterone and two grams of potassium acetate in 150 milliliters of methanol was added dropwise 3.09 grams (1.00 ml.; 0.0193 mole) of bromine. When the addition was complete, 3.24 grams (0.06 mole) of sodium methoxide in forty milliliters of methanol was added thereto, whereafter the whole was maintained at about 25 degrees centigrade for sixteen hours. The reaction mixture was then mixed with a large volume of water and the whole was extracted successively with one portion of benzene and two portions of methylene chloride. The combined extracts were dried over anhydrous sodium sulfate and the solvent was then removed therefrom by distillation. The residue was dissolved in 100 milliliters of methylene chloride and chromatographed over and eluted from 150 grams of Florisil synthetic magnesium silicate in exactly the same manner described in Example 3. The methylene chloride plus five percent acetone eluates contained 1.2 grams of 3,11-diketo-4,17(20)-pregnadiene-21-oicacid methyl ester, melting at 155 to 188 degrees centigrade. Crystallization of these crystals from a mixture of acetone plus Skellysolve B hexane hydrocarbons gave crystals melting at 207 to 212 degrees centigrade.

Similarly, 3,11-diketo-4,17(20)-pregnadiene-21-oicacid methyl ester and other alkyl esters are prepared from 11-keto-21-formylprogesterone, other 11-keto-21-alkoxyoxalylprogesterones, or alkali-metal enolates thereof, described in Examples 1 and 2 without the isolation of the intermediately formed 21,21-dihalo compound by reaction of the selected 21-formyl or 21-alkoxyoxalyl compound with approximately two molar equivalents of the selected halogen in methanol or other alkanol followed by the addition thereto of sodium methoxide or other alkali-metal alkoxide and then acidifying the reaction mixture.

In the same manner as given in Examples 3, 4, or 7, the following compounds are prepared by reaction of the selected 20-keto-21-formyl-21,21-dihalosteroid or 20-keto-21-alkoxyoxalyl-21,21-dihalosteroid with sodium methoxide in methanol: 3α-hydroxy-11-keto-17(20)-pregnene-21-oicacid methyl ester (free acid, M. P., 285 to 288 degrees centigrade) from 3α-hydroxy-21-formyl-21,21-dihalopregnane-11,20-dione or 3α-hydroxy-21-alkoxyoxalyl - 21,21 - dihalopregnane - 11,20 - dione, 3 - keto - 4,17(20)-pregnadiene-21-oicacid methyl ester from 21-formyl-21,21-dihalo-4-pregnene-3,20-dione or 21-alkoxyoxalyl - 21,21 - dihalo - 4 - pregnene - 3,20 - dione, 3α, 11α - dihydroxy - 17(20) - pregnene - 21 - oicacid methyl ester from 3α,11α - dihydroxy - 21 - formyl - 21,21 - dihalopregnane - 20 - one or 3α,11α - dihydroxy - 21 - alkoxyoxalyl - 21,21 - dihalopregnane - 20 - one, and other $\Delta^{17(20)}$-21-oicacid methyl ester steroids from other 20-keto-21-formyl-21,21-dihalosteroids possessing a 17-hydrogen or other 20-keto-21-alkoxyoxalyl-21,21-dihalosteroids possessing a 17-hydrogen by reaction of the latter compounds with sodium methoxide or potassium methoxide, or the like, in methanol, wherein in every case halo is a halogen having an atomic weight from 35 to 127, i. e., chlorine, bromine, iodine, or the like, and wherein alkoxy is, for example, methoxy, ethoxy, propoxy, butoxy, amyloxy, hexyloxy, heptyloxy, octyloxy, or the like. Esters other than the methyl ester of the 21-acid are prepared in the same manner using, instead of the alkali-metal methoxide in methanol, the selected alkali-metal alkoxide, e. g., sodium or potassium ethoxide, propoxide, isopropoxide, butoxide, amyloxide, hexyloxide, or octyloxide, in an alkanol, preferably corresponding to the alcohol portion of the alkali-metal alkoxide employed.

*Example 8.—3-keto-4,17(20)-pregnadiene-21-oicacid methyl ester*

In the manner of the preceding examples, reacting progesterone with ethyl oxalate and a molar equivalent of sodium methoxide produces 21-ethoxyoxalylprogesterone sodium salt which, upon reaction with about two molar equivalents of bromine in methanol, yields 21,21-dibromo-21-ethoxyoxalylprogesterone. This compound is converted to 3-keto-4,17(20)-pregnadiene-21-oicacid methyl ester by addition of sodium methoxide to the latter reaction mixture after addition of the bromine is complete. Addition of water precipitates the desired product.

The reactions described below are productive of compounds which are especially useful as precursors to 17α,21 - dihydroxy - 4 - pregnene - 3,11,20 - trione (Kendall's Compound E).

PREPARATION 1A.—SODIUM ENOLATE OF 11α-HYDROXY-21-ETHOXYOXALYLPROGESTERONE

Three and three-tenths (3.3) grams of 11α-hydroxyprogesterone, Peterson and Murray, J. Am. Chem. Soc., 74, 1871 (1952), was dissolved in a solution of 0.25 gram of sodium in eight milliliters of absolute ethanol, and 1.46 grams of ethyl oxalate was added thereto. The resulting solution was allowed to stand for six hours at room temperature, during which time the color of the solution changed from yellow to brown. The sodium enolate of 11α-hydroxy-21-ethoxyoxalylprogesterone thus produced was isolated, by the addition of a large volume of ether, as a yellow amorphous solid which decomposed above 200 degrees centigrade.

The structure of this yellow solid was confirmed by infrared analysis which displayed the following significant absorption: (1) strong absorption at about 1720 cm.$^{-1}$ which is within the range for a conjugated ester, thus indicating the presence of such a group and substantiating the success of the reaction; (2) strong absorption at about 1631 cm.$^{-1}$ and about 1465 cm.$^{-1}$, these absorption bands being characteristic of metal enolates, which evidences that a sodium enolate was obtained as postulated; (3) strong absorption at about 1670 cm.$^{-1}$ which is characteristic of a simple conjugated ketone, thus verifying the unchanged characteristics of the $\Delta^4$-three keto group of the starting 11α-hydroxyprogesterone negating the possibility of condensation at position two. The condensation therefore took place at the other activated position, namely position 21.

PREPARATION 2A.—POTASSIUM ENOLATE OF 11α-HYDROXY-21-ETHOXYOXALYLPROGESTERONE

Using essentially the procedure described in Preparation 1A, 11α-hydroxyprogesterone is converted to the potassium enolate of 11α-hydroxy-21-ethoxyoxalylprogesterone by reaction with ethyl oxylate and potassium in tertiary butyl alcohol.

In a manner similar to Preparations 1A and 2A, the following compounds are prepared by reaction of 11α-hydroxyprogesterone and the appropriate alkyl oxalate with a sodium or potassium alkoxide in benzene: sodium enolate of 11α-hydroxy-21-methoxyoxalylprogesterone, sodium enolate of 11α-hydroxy-21-propoxyoxalylprogesterone, sodium enolate of 11α-hydroxy-21-butoxyoxalylprogesterone, sodium enolate of 11α-hydroxy-21-amyloxyoxalylprogesterone, sodium enolate of 11α-hydroxy-21-hexyloxyoxalylprogesterone, sodium enolate of 11α-hydroxy-21-heptyloxyoxalylprogesterone, sodium enolate of 11α-hydroxyl-21-octyloxyoxalylprogesterone, the potassium analogues of these and like compounds, and others.

Acidification of an aqueous solution of any of the above-described alkali-metal enolates is productive of a precipitate of the free 11α-hydroxy-21-alkoxyoxalylprogesterone.

PREPARATION 3A.—SODIUM ENOLATE OF 11α-HYDROXY-21-FORMYLPROGESTERONE

To a mixture of 3.4 milliliters of a 3.4 N methanolic sodium methoxide solution, 0.45 milliliter of absolute ethanol, and twenty milliliters of dry benzene, said mixture previously having been distilled until eight milliliters of distillate had been collected and then cooled, was added two milliliters of ethyl formate and a solution of 3.26 grams (0.01 mole) of 11α-hydroxyprogesterone in 38 milliliters of dry benzene. The solution became turbid and a yellow precipitate formed. The reaction mixture was stirred at room temperature for one hour, sixty milliliters of ether was then added thereto, and stirring was continued for ninety minutes, whereafter a sixty-milliliter portion of ether was added thereto. The thus-formed yellow precipitate of the sodium enolate of 11α-hydroxy-21-formylprogesterone was filtered and washed with several fifty-milliliter portions of ether. The ether wash contained some unreacted 11α-hydroxy-progesterone. The presence of a sodium enolate was verified by the extreme solubility of the product in water and by a positive ferric chloride test for enols as exhibited by the formation of a red color when the product was dissolved in alcoholic and aqueous ferric chloride solutions. The structure was further verified by conversion of the enolate to the free 11α-hydroxy-21-formylprogesterone, having an infrared absorption spectrum analysis consistent with that structure.

PREPARATION 4A.—POTASSIUM ENOLATE OF 11α-HYDROXY-21-FORMYLPROGESTERONE

Using essentially the procedure described in Preparation 3A, 11α-hydroxyprogesterone is converted to the potassium enolate of 11α-hydroxy-21-formylprogesterone by reaction with ethyl formate and potassium in tertiary butyl alcohol.

Acidification of an aqueous solution of either the sodium or potassium enolate of 11α-hydroxy-21-formylprogesterone is productive of a precipitate of 11α-hydroxy-21-formylprogesterone.

PREPARATION 5A.—SODIUM ENOLATE OF 11β-HYDROXY-21-ETHOXYOXALYLPROGESTERONE

One hundred and forty-four (144) milligrams (6.25 millimoles) of sodium was dissolved in five milliliters of absolute ethanol under an atmosphere of nitrogen and to this solution were added eight milliliters of benzene and 0.8 milliliter (0.9 gram; 6.15 millimoles) of ethyl oxalate. The mixture was cooled in an ice-water bath and a solution of 1.99 grams (6.03 millimoles) of 11β-hydroxyprogesterone, dissolved in five milliliters of absolute ethanol and mixed with 25 milliliters of dry benzene, was added in a slow stream to the stirred solution. The reaction mixture was stirred at room temperature for 2.5 hours at the end of which time a 100-milliliter portion of ether was added followed by another 100-milliliter portion of ether one hour later. The thus-produced pale yellow precipitate was filtered and washed with ether. The yield was 1.6 grams (62 percent).

The yellow solid, identified as the sodium enolate of 11β-hydroxy-21-ethoxyoxalylprogesterone by conversion to the known corticosterone acetate, displayed the following significant infrared absorption: (1) strong absorption at about 1716 cm.$^{-1}$, which is within the range of a conjugated ester; (2) strong absorption at about 1634 cm.$^{-1}$ and 1470 cm.$^{-1}$, these absorption bands being characteristic of metal enolates; (3) strong absorption at about 1670 cm.$^{-1}$ which is characteristic of simple conjugated ketones; those absorption bands verifying the theoretical structure.

PREPARATION 6A.—POTASSIUM ENOLATE OF 11β-HYDROXY-21-FORMYLPROGESTERONE

Using essentially the procedure described in Preparation 5A, 11β-hydroxyprogesterone is converted to the potassium enolate of 11β-hydroxy-21-formylprogesterone by reaction with ethyl formate and potassium in tertiary butyl alcohol.

Acidification of a solution of either the sodium or potassium enolate of 11β-hydroxy-21-formylprogesterone is productive of 11β-hydroxy-21-formylprogesterone.

Example 1A. — 11α-hydroxy-21,21-dibromo-21-ethoxyoxalylprogesterone

To a stirred solution of 4.52 grams (0.01 mole) of the sodium enolate of 11α-hydroxy-21-ethoxyoxalylprogesterone in 150 milliliters of methanol was added dropwise one milliliter (0.02 mole) of bromine. The thus-produced 11α-hydroxy-21,21-dibromo-21-ethoxyoxalylprogesterone is isolated by pouring the reaction mixture into a large volume of water and separating the precipitated product.

Other 11α-hydroxy-21,21-dihalo-21-alkoxyoxalylprogesterones are prepared wherein the dihalo group is dibromo, dichloro, or diiodo and the alkoxy group is methoxy, ethoxy, propoxy, butoxy, amyloxy, hexyloxy, heptyloxy, octyloxy, or the like, by dihalogenating the selected 11α-hydroxy-21-alkoxyoxalylprogesterone or alkali-metal enolate thereof with chlorine, bromine, or iodine, according to the method described in Example 1A.

Example 2.—11α-hydroxy-21,21-dichloro-21-formylprogesterone

In exactly the same manner as described in Example 1A, contacting 11α-hydroxy-21-formylprogesterone with approximately two molar equivalents of chlorine is productive of 11α-hydroxy-21,21-dichloro-21-formylprogesterone.

Similarly, 11α-hydroxy-21,21-dibromo-21-formylprogesterone and 11α-hydroxy-21,21-diiodo-21-formylprogesterone are prepared by substituting an equivalent molar amount of bromine and iodine, respectively, for the chlorine used in the above-described reaction of Example 2A.

Example 3A.—11β-hydroxy-21,21-dibromo-21-ethoxyoxalylprogesterone

In exactly the same manner as described in Example 1A, contacting the sodium enolate of 11β-hydroxy-21-ethoxyoxalylprogesterone with approximately two molar equivalents of bromine is productive of 11β-hydroxy-21,21-dibromo-21-ethoxyoxalylprogesterone.

In a similar manner, other 11β-hydroxy-21,21-dihalo-21-alkoxyoxalylprogesterones are prepared wherein the alkoxy group is methoxy, ethoxy, propoxy, butoxy, amyloxy, hexyloxy, heptyloxy, octyloxy, or the like, by reacting the selected 11β-hydroxy-21-alkoxyoxalylprogesterone or alkali-metal enolate thereof with approximately two moles of chlorine, bromine, or iodine.

Similarly, 11β-hydroxy-21,21-dihalo-21-formylprogesterones are prepared by substituting 11β-hydroxy-21-formylprogesterone or an alkali-metal enolate thereof for 11β-hydroxy-21-ethoxyoxalylprogesterone in the procedure of the foregoing example.

Example 4A.—3-keto-11α-hydroxy-4,17(20)-pregnadiene-21-oic acid methyl ester

To a solution of 29.4 grams (0.05 mole) of 11α-hydroxy-21,21-dibromo-21-ethoxyoxalylprogesterone in 550 milliliters of methanol was added a solution of 16.5 grams (0.3 mole) of sodium methoxide in 500 milliliters of methanol. The reaction mixture was maintained at about 25 degrees centigrade for sixteen hours whereafter an equal volume of water was added thereto and the whole was extracted with about equal portions of first benzene and then two portions of methylene chloride. The combined extracts were dried with anhydrous sodium sulfate and thereafter distilled to remove the solvent therefrom. The distillation residue was dissolved in 500 milliliters of methylene chloride and chromatographed over 875 grams of Florisil synthetic magnesium silicate. The column was developed with 1,250-milliliter portions of solvents of the following composition and order: four of methylene chloride plus five per cent acetone, four of methylene chloride plus ten per cent acetone, four of methylene chloride plus fifteen per cent acetone, two of methylene chloride plus twenty per cent acetone, and finally, two of acetone. The methylene chloride plus ten per cent acetone eluates and the first methylene chloride plus fifteen per cent acetone eluate were combind and the solvent distilled therefrom. The seven grams of distillation residue was recrystallized from a mixture of ethyl acetate and Skellysolve B hexane hydrocarbons to yield crystalline 3-keto-11α-hydroxy-4,17(20)-pregnadiene-21-oic acid methyl ester, melting at 205 to 210 degrees centigrade and having an $E_{239}$ of 22,425 and an $[\alpha]_D^{23}$ of plus 133 degrees in acetone.

Analysis.—Calculated for $C_{22}H_{30}O_4$: C, 73.75; H, 8.48. Found: C, 73.77; H, 8.38. C, 74.10; H, 8.59.

Similarly, other 3-keto-11α-hydroxy-4,17(20)-pregnadiene-21-oic acid esters are prepared wherein the ester is methyl, propyl, butyl, amyl, hexyl, heptyl, octyl, or the like, by replacing the sodium methoxide in methanol used in the above-described reaction by the selected alkali-metal alkoxide in an alkanol.

Example 5A.—3-keto-11β-hydroxy-4,17(20)-pregnadiene-21-oic acid ethyl ester

In the same manner as described in Example 4A, 3-keto-11β-hydroxy-4,17(20)-pregnadiene-21-oic acid ethyl ester is prepared by replacing the sodium methoxide in methanol used in the above-described example by sodium ethoxide in ethanol and 11β-hydroxy-21,21-dibromo-21-ethoxyoxalylprogesterone or another 11β-hydroxy-21,21-dihalo-21-alkoxyoxalylprogesterone, or 11β-hydroxy-21,21-dibromo-21-formylprogesterone, or another 11β-

15 hydroxy-21,21-dihalo-21-formylprogesterone for the 11α-hydroxy-21,21-dibromo-21-ethoxyoxalylprogesterone used therein.

*Example 6A.—3-keto-11α-hydroxy-4,17(20)-pregnadiene-21-oic acid*

In exactly the same manner as given in Example 4A, 3-keto-11α-hydroxy-4,17(20)-pregnadiene-21-oic acid is prepared from 11α-hydroxy-21,21-dibromo-21-ethoxyoxalylprogesterone by substituting 34 grams (0.6 mole) of potassium hydroxide for the sodium methoxide in the above-described reaction. 3-keto-11α-hydroxy-4,17(20)-pregnadiene-21-oic acid is isolated from the reaction mixture by adding water thereto, washing with methylene chloride, and then acidifying the washed reaction mixture. The precipitated 3-keto-11α-hydroxy-4,17(20)-pregnadiene-21-oic acid is purified by separating the precipitated product and crystallizing the dried product from a solvent such as, for example, acetone plus Skellysolve B hexane hydrocarbons.

*Example 7A.—3-keto-11α-hydroxy-4,17(20)-pregnadiene-21-oic acid*

In the same manner as described in Example 6A, 3-keto-11α-hydroxy-4,17(20)-pregnadiene-21-oic acid is prepared by reacting any of the dihalo compounds described in Examples 1A and 2A with a base, preferably an alkali-metal hydroxide or other alkali-metal base in the presence of water, and thereafter acidifying the reaction mixture, as with a mineral acid, e. g., hydrochloric, sulfuric acid, or the like, to produce the free acid.

*Example 8A.—3-keto-11α-hydroxy-4,17(20)-pregnadiene-21-oic acid methyl ester (without isolation of intermediate 21,21-dihalo compound)*

In essentially the same manner as described in Examples 4A and 5A, 3-keto-11α-hydroxy-4,17(20)-pregnadiene-21-oic acid methyl ester is prepared from the sodium enolate of 11α-hydroxy-21-ethoxyoxalylprogesterone by reaction of the latter compound with approximately two molar equivalents of bromine followed by the addition of sodium methoxide to the reaction without the isolation of the intermediately produced 3-keto-11α-hydroxy-21,21-dibromo-21-ethoxyoxalylprogesterone.

Similarly, 3-keto-11α-hydroxy-4,17(20)-pregnadiene-21-oic acid methyl ester and other alkyl esters are prepared from 11α-hydroxy-21-formylprogesterone or other 11α-hydroxy-21-alkoxyoxalylprogesterones described in Examples 1A and 2A without the isolation of the intermediately formed 21,21-dihalo compound by reaction of the selected 21-formyl or 21-alkoxyoxalyl compound with approximately two molar equivalents of the selected halogen in methanol or other alkanol followed by the addition thereto of sodium methoxide or other alkali-metal alkoxide and then acidifying the reaction mixture.

Similarly, 3 - keto - 11β - hydroxy - 4,17(20) - pregnadiene-21-oic acid and alkyl esters thereof such as, for example, the methyl melting at 218 to 220 degrees centigrade, ethyl, propyl, butyl, amyl, hexyl, heptyl, octyl ester, or the like, are prepared by reacting an 11β-hydroxy-21-alkoxyoxalyl-21,21-dihaloprogesterone or 11β-hydroxy-21-formyl-21,21-dihaloprogesterone with a base, e. g., sodium or potassium hydroxide, preferably in the presence of water, or a sodium or potassium alkoxide such as, for example, sodium methoxide, sodium ethoxide, potassium butoxide, or the like, according to the procedure described in Examples 4A through 8A.

In the same manner according to the procedure of the preceding examples and preparations, the following compounds are prepared: 3α,11α-dihydroxypregnane-17(20)-pregnene-21-oic acid methyl ester from 3α,11α-dihydroxypregnane-20-one, 3β-hydroxy-11-keto-17(20)-pregnene-21-oic acid ethyl ester from 3β-hydroxypregnane-11,20-dione, 3α-acetoxy-11β-hydroxy-17(20)-pregnene-21-oic acid from 3α-acetoxy-11β-hydroxypregnane-20-one, 3β-acetoxy-11-keto-17(20)-allopregnene-21-oic acid methyl ester from 3β-acetoxyallopregnane-11,20-dione, 3-keto-9(11)-oxido-17(20)-pregnene-21-oic acid propyl ester from 9(11)-oxidopregnane-3,20-dione, and the like.

16

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. In a process for the production of a compound selected from steroid $\Delta^{17(20)}$-unsaturated-21-acids of the formula St=CH—COOH, wherein St is a cyclopentanopolyhydrophenanthrene nucleus attached to the side chain at carbon atom 17, salts thereof, and esters thereof, the step of contacting a steroid represented by the following formula:

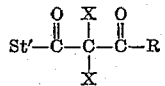

wherein X is a halogen having an atomic weight from 35 to 127, inclusive, wherein R is selected from the group consisting of hydrogen and a radical of the formula —COO—hydrocarbon, and wherein St' represents a cyclopentanopolyhydrophenanthrene nucleus attached to the above-identified side chain at carbon atom 17 and having a 17-hydrogen atom, with a base, in the presence of ions selected from the group consisting of hydrogen ions and alkoxy ions, to produce a $\Delta^{17(20)}$-unsaturated-21-carbonyloxysteroid.

2. A process for the production of an ester of a steroid $\Delta^{17(20)}$-unsaturated-21-acid of the formula

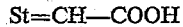

wherein St is a cyclopentanopolyhydrophenanthrene nucleus attached to the side chain at carbon atom 17, which comprises: contacting a steroid represented by the following formula:

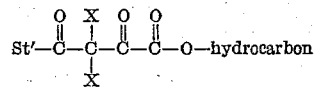

wherein X is a halogen having an atomic weight from 35 to 127, inclusive, and wherein St' represents a cyclopentanopolyhydrophenanthrene nucleus attached to the above-identified side chain at carbon atom 17 and having a 17-hydrogen atom, having an oxygenated carbon atom in the 3 position and consisting solely of carbon, hydrogen and oxygen atoms, with a base, in the presence of alkoxy ions to produce a $\Delta^{17(20)}$-unsaturated-21-carbonyloxysteroid.

3. The process of claim 2 wherein the base is sodium methoxide.

4. The process of claim 2 wherein X is a bromine atom.

5. A process for the production of an ester of a steroid $\Delta^{17(20)}$-unsaturated-21-oic acid of the formula

wherein St is a cyclopentanopolyhydrophenanthrene nucleus attached to the side chain at carbon atom 17, which comprises: contacting a steroid represented by the following formula:

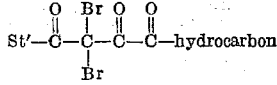

wherein St' represents a $\Delta^4$-3-ketoandrostene nucleus attached to the above-identified side chain at carbon atom 17 and having a 17-hydrogen atom, having an oxygenated carbon atom in the 3 position and consisting solely of carbon, hydrogen and oxygen atoms, with a base, in the presence of alkoxy ions to produce a $\Delta^{17(20)}$-unsaturated-21-carbonyloxysteroid.

6. The process of claim 5 wherein the $\Delta^4$-3-ketoandrostene nucleus is the $\Delta^4$-3-keto-11-hydroxyandrostene nucleus and the reaction product is 3-keto-11-hydroxy-4,17(20)-pregnadiene-21-oic acid alkyl ester.

7. The process of claim 5 wherein the $\Delta^4$-3-ketoandrostene nucleus is the $\Delta^4$-3-keto-11α-hydroxyandrostene nucleus and wherein the base is sodium methoxide and the reaction product is 3-keto-11α-hydroxy-4,17(20)-pregnadiene-21-oic acid methyl ester.

8. The process of claim 5 wherein the $\Delta^4$-3-ketoandrostene nucleus is the $\Delta^4$-3,11-diketoandrostene nucleus and the reaction product is 3,11-diketo-4,17(20)-pregnadiene-21-oic acid alkyl ester.

9. The process of claim 5 wherein the $\Delta^4$-3-ketoandrostene nucleus is the $\Delta^4$-3,11-diketoandrostene nucleus and the base is sodium methoxide and the reaction product is 3,11-diketo-4,17(20)-pregnadiene-21-oic acid methyl ester.

10. A process for the production of a steroid $\Delta^{17(20)}$-unsaturated-21-oic acid of the formula St=CH—COOH, wherein St is a cyclopentanopolyhydrophenanthrene nucleus attached to the side chain at carbon atom 17, which comprises: contacting a steroid represented by the following formula:

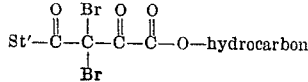

wherein St′ represents a $\Delta^4$-3-ketoandrostene nucleus attached to the above-identified side chain at carbon atom 17 and having a 17-hydrogen atom, having an oxygenated carbon atom in the 3 position and consisting solely of carbon, hydrogen and oxygen atoms with a base, in the presence of hydroxy ions to produce a $\Delta^{17(20)}$-unsaturated-21-carbonyloxysteroid.

11. The process of claim 10 wherein the base is an alkali-metal hydroxide.

12. The process of claim 10 wherein the base is sodium hydroxide.

13. The process of claim 10 wherein the $\Delta^4$-3-ketoandrostene nucleus is the $\Delta^4$-3-keto-11-hydroxy nucleus and the reaction product is 3-keto-11-hydroxy-4,17(20)-pregnadiene-21-oic acid.

14. The process of claim 10 wherein the $\Delta^4$-3-ketoandrostene nucleus is the $\Delta^4$-3-keto-11α-hydroxyandrostene nucleus and the base is sodium hydroxide and the reaction product is 3-keto-11α-hydroxy-4,17(20)-pregnadiene-21-oic acid.

15. A process for the production of 3-keto-11α-hydroxy-4,17(20)-pregnadiene-21-oic acid which comprises: contacting a steroid represented by the following formula:

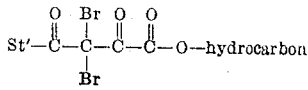

wherein St′ represents the $\Delta^4$-3-keto-11α-hydroxyandrostene nucleus attached to the above-identified side chain at carbon atom 17 and having a 17-hydrogen atom, with sodium hydroxide, and adding acid to the resulting mixture to produce 3-keto-11α-hydroxy-4,17(20)-pregnadiene-21-oic acid.

16. A process for the production of an ester of a steroid $\Delta^{17(20)}$-unsaturated-21-oic acid of the formula St=CH—COOH, wherein St is a cyclopentanopolyhydrophenanthrene nucleus attached to the side chain at carbon atom 17, which comprises: contacting a steroid represented by the following formula:

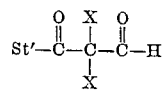

wherein X is a halogen having an atomic weight from 35 to 127, inclusive, and wherein St′ represents a cyclopentanopolyhydrophenanthrene nucleus attached to the above-identified side chain at carbon atom 17 and having a 17-hydrogen atom, having an oxygenated carbon atom in the 3 position and consisting solely of carbon, hydrogen and oxygen atoms, with a base, in the presence of alkoxy ions to produce a $\Delta^{17(20)}$-unsaturated-21-carbonyloxysteroid.

17. The process of claim 16 wherein the base is sodium methoxide.

18. The process of claim 16 wherein X is a bromine atom.

19. A process for the production of an ester of a steroid $\Delta^{17(20)}$-unsaturated-21-oic acid of the formula St=CH—COOH, wherein St is a cyclopentanopolyhydrophenanthrene nucleus attached to the above-identified side chain at carbon atom 17, which comprises: contacting a steroid represented by the following formula:

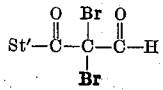

wherein St′ represents a $\Delta^4$-3-ketoandrostene nucleus attached to the above-identified side chain at carbon atom 17 and having a 17-hydrogen atom, having an oxygenated carbon atom in the 3 position and consisting solely of carbon, hydrogen and oxygen atoms, with a base, in the presence of alkoxy ions to produce a $\Delta^{17(20)}$-unsaturated-21-carbonyloxysteroid.

20. The process of claim 19 wherein the $\Delta^4$-3-ketoandrostene nucleus is the $\Delta^4$-3-keto-11-hydroxyandrostene nucleus and the reaction product is 3-keto-11-hydroxy-4,17(20)-pregnadiene-21-oic acid alkyl ester.

21. The process of claim 19 wherein the $\Delta^4$-3-ketoandrostene nucleus is the $\Delta^4$-3-keto-11α-hydroxyandrostene nucleus and the base is sodium methoxide and the reaction product is 3-keto-11α-hydroxy-4,17(20)-pregnadiene-21-oic acid methyl ester.

22. A process for the production of a steroid $\Delta^{17(20)}$-unsaturated-21-oic acid of the formula St=CH—COOH, wherein St is a cyclopentanopolyhydrophenanthrene nucleus attached to the side chain at carbon atom 17, which comprises: contacting a steroid represented by the following formula:

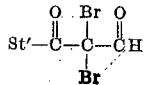

wherein St′ represents a $\Delta^4$-3-ketoandrostene nucleus attached to the above-identified side chain at carbon atom 17 and having a 17-hydrogen atom, having an oxygenated carbon atom in the 3 position and consisting solely of carbon, hydrogen and oxygen atoms, with a base, in the presence of hydroxy ions to produce a $\Delta^{17(20)}$-unsaturated-21-carbonyloxysteroid.

23. The process of claim 22 wherein the base is an alkali-metal hydroxide.

24. The process of claim 22 wherein the base is sodium hydroxide.

25. The process of claim 22 wherein the $\Delta^4$-3-ketoandrostene nucleus is the $\Delta^4$-3,11-diketoandrostene nucleus and the base is sodium hydroxide and the reaction product is 3,11-diketo-4,17(20)-pregnadiene-21-oic acid.

26. A process for the production of 3,11-diketo-4,17(20)-pregnadiene-21-oic acid which comprises: contacting a steroid represented by the following formula:

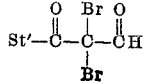

wherein St′ represents the $\Delta^4$-3,11-diketoandrostene nucleus attached to the above-identified side chain at carbon atom 17 and having a 17-hydrogen atom, with sodium hydroxide, and adding acid to the resulting mixture to produce 3,11-diketo-4,17(20)-pregnadiene-21-oic acid.

27. A steroid represented by the following formula:

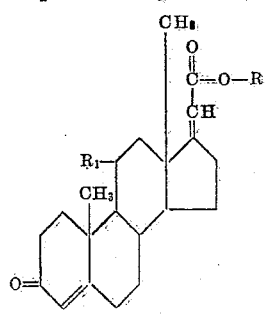

wherein R is selected from the group consisting of hydrogen, an alkali-metal, and hydrocarbon radicals containing up to eight carbon atoms, inclusive, and wherein $R_1$ is selected from the group consisting of $\alpha$-hydroxy, $\beta$-hydroxy, and ketonic oxygen.

28. A compound of claim 27 wherein $R_1$ is hydroxy and wherein R is hydrogen.

29. A compound of claim 27 wherein $R_1$ is hydroxy and R is hydrocarbon.

30. A lower-alkyl ester of 3-keto-11$\alpha$-hydroxy-4,17(20)-pregnadiene-21-oic acid represented by the following formula:

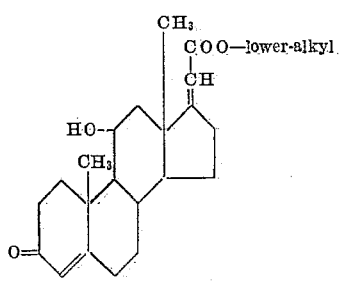

31. A lower-alkyl ester of 3-keto-11$\beta$-hydroxy-4,17(20)-pregnadiene-21-oic acid represented by the following formula:

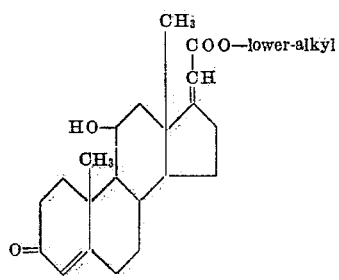

32. A lower-alkyl ester of 3,11-diketo-4,17(20)-pregnadiene-21-oic acid represented by the following formula:

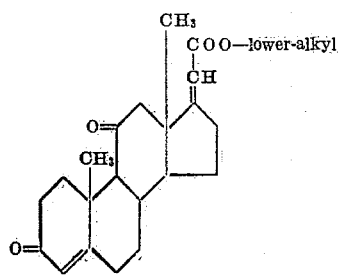

33. 3-keto-11$\alpha$-hydroxy-4,17(20)-pregnadiene-21-oic acid.

34. 3,11-diketo-4,17(20)-pregnadiene-21-oic acid.

35. 3-keto-11$\alpha$-hydroxy-4,17(20)-pregnadiene-21-oic acid methyl ester.

36. 3-keto-11$\beta$-hydroxy-4,17(20)-pregnadiene-21-oic acid methyl ester.

37. 3,11-diketo-4,17(20)-pregnadiene-21-oic acid methyl ester.

38. A process for the production of a $\Delta^{17(20)}$-21-carbonyloxy steroid which comprises: contacting a steroid represented in its enolic form by the following formula:

$$St-\overset{O}{\underset{\|}{C}}-\overset{H}{\underset{|}{C}}-\overset{O-M}{\underset{|}{C}}-R$$

wherein M is selected from the group consisting of hydrogen and an alkali metal and wherein R is selected from the group consisting of hydrogen and a radical having the formula $$-\overset{O}{\underset{\|}{C}}-O-R'$$

R' being a hydrocarbon radical, and wherein St represents a cyclopentanopolyhydrophenanthrene nucleus attached to the above-identified side chain at carbon atom 17, and having a 17-hydrogen atom, having an oxygenated carbon atom in the 3 position and consisting solely of carbon, hydrogen and oxygen atoms, with about two molar equivalents of a halogen having an atomic weight from 35 to 127, in an alkanol and thereafter adding a base to the reaction mixture to produce a $\Delta^{17(20)}$-unsaturated-21-carbonyloxy steroid represented by the formula St'=CH—COO—alkyl, wherein St' represents a cyclopentanopolyhydrophenanthrene nucleus attached to the above-identified side chain at carbon atom 17.

39. The process of claim 38 wherein St and St' represent a $\Delta^4$-3-keto androstene nucleus, the alkanol is methanol, and the base is sodium methoxide.

40. The process of claim 38 wherein St and St' represent the $\Delta^4$-3,11-diketo-androstene nucleus, the halogen is bromine, the alkanol is methanol, the base is sodium methoxide, and the reaction product is 3-11-diketo-4,17(20)-pregnadiene-21-oic acid methyl ester.

41. The process of claim 38 wherein St and St' represent the $\Delta^4$-3-keto-11$\alpha$-hydroxy-androstene nucleus, the halogen is bromine, the alkanol is methanol, the base is sodium methoxide, and the reaction product is 3-keto-11$\alpha$-hydroxy-4,17(20)-pregnadiene-21-oic acid methyl ester.

References Cited in the file of this patent

UNITED STATES PATENTS 2,359,773    Marker _____ Oct. 10, 1944

OTHER REFERENCES

Fieser et al.: Natural Products Related to Phenanthrene, 3rd ed., pp. 424–26 (1949).